(12) United States Patent
Lien

(10) Patent No.: US 12,543,891 B2
(45) Date of Patent: Feb. 10, 2026

(54) GRILL

(71) Applicant: Mor Designs Ltd., Taipei (TW)

(72) Inventor: Hung-Mei Lien, Taipei (TW)

(73) Assignee: MOR DESIGNS LTD., Taipei (TW)

( * ) Notice: Subject to any disclaimer, the term of this patent is extended or adjusted under 35 U.S.C. 154(b) by 387 days.

(21) Appl. No.: 18/195,080

(22) Filed: May 9, 2023

(65) Prior Publication Data
US 2024/0335066 A1 Oct. 10, 2024

(30) Foreign Application Priority Data

Apr. 4, 2023 (CN) .......................... 202320763808.X

(51) Int. Cl.
*A47J 37/07* (2006.01)

(52) U.S. Cl.
CPC ................................. *A47J 37/0713* (2013.01)

(58) Field of Classification Search
CPC . A47J 37/0713; A47J 37/0727; A47J 37/0774
See application file for complete search history.

(56) References Cited

U.S. PATENT DOCUMENTS

| | | | | |
|---|---|---|---|---|
| 4,934,333 | A * | 6/1990 | Ducate, Jr. .............. | F24C 15/36 126/211 |
| 8,381,712 | B1 * | 2/2013 | Simms, II ........... | A47J 37/0704 126/2 |
| 8,839,780 | B1 * | 9/2014 | Bennett ............... | A47J 37/0713 126/21 R |
| 2003/0213484 | A1 * | 11/2003 | Alden ................. | A47J 37/0713 126/41 R |
| 2007/0204858 | A1 * | 9/2007 | Abelbeck .................. | F24C 3/12 126/41 R |
| 2014/0072920 | A1 * | 3/2014 | Deng ...................... | F23D 17/00 431/280 |
| 2022/0018539 | A1 * | 1/2022 | Scott ..................... | F23D 14/045 |

* cited by examiner

*Primary Examiner* — Alfred Basichas
(74) *Attorney, Agent, or Firm* — CANTOR COLBURN LLP

(57) ABSTRACT

A grill including: a grill box, defining therein a grill cavity; a burner assembly, including a main burner and a side burner; a first solenoid valve; a second solenoid valve; and a controller assembly. The burner assembly is arranged in the grill cavity. The first solenoid valve is in connection with the main burner. The second solenoid valve is in connection with the side burner and the first solenoid valve. The first solenoid valve is configured to connect with the gas supply. The controller assembly is in connection with the first solenoid valve and the second solenoid valve, respectively. The controller assembly is configured to control an on-off state of the first solenoid valve and the second solenoid valve.

12 Claims, 6 Drawing Sheets

GRILL

CROSS-REFERENCE TO RELATED APPLICATIONS

Pursuant to 35 U.S.C. § 119 and the Paris Convention, this application claims the benefit of Chinese Patent Application No. 202320763808.X filed Apr. 4, 2023, the contents of which are incorporated herein by reference.

BACKGROUND

Technical Field

The present application relates to the technical field of cooking equipment, more particularly, to a grill.

Description of Related Art

A grill is a device for grilling food. When grilling the food, different food may require different temperatures for different operations. For example, some frozen foods need to be thawed before cooking. To avoid affecting the taste, the temperature required to thaw the food is lower than the temperature required to grill the food. For another example, after the food is cooked, a certain temperature is required to keep the food warm. In order to prevent the food from being burnt, the temperature required to keep the food warm should be lower than the temperature required to grill the food.

At present, common grills on the market mainly include traditional charcoal grills and gas grills. The traditional charcoal grills are mainly heated by charcoal, and the temperature is difficult to control accurately. Although the gas grills can adjust the temperature by adjusting the intensity of the fire, only the overall intensity of the fire can be adjusted, which make the overall temperature in the grill cavity of the entire grill rises or falls, but it is impossible to perform different operations on foods with different temperature requirements at the same time, resulting in relatively low cooking efficiency.

SUMMARY

It is an object of embodiments of the present application to provide a grill, which aims at solving the technical problem that the existing grill cannot perform different operations on food with different temperature requirements simultaneously, and therefore has low cooking efficiency.

To achieve the above object, the following technical solutions are adopted:

A grill is provided. The grill includes: a grill box, defining therein a grill cavity; a burner assembly, comprising a main burner and a side burner; a first solenoid valve; a second solenoid valve; and a controller assembly. The burner assembly is arranged in the grill cavity. The first solenoid valve is in connection with the main burner. The second solenoid valve is in connection with the side burner and the first solenoid valve. The first solenoid valve is configured to connect with the gas supply. The controller assembly is in connection with the first solenoid valve and the second solenoid valve, respectively. The controller assembly is configured to control an on-off state of the first solenoid valve and the second solenoid valve.

In a possible configuration, the side burner is one of a plurality of side burners. The second solenoid valve is one of a plurality of second solenoid valves. The plurality of side burners and the plurality of second solenoid valves are arranged in a manner of one-to-one correspondence.

In a possible configuration, each of the plurality of second solenoid valves is connected to the first solenoid valve.

In a possible configuration, the plurality of second solenoid valves are sequentially connected, and one of the plurality of second solenoid valves is connected with the first solenoid valve.

In a possible configuration, the grill further comprises a temperature detector. The temperature detector is arranged in the grill cavity; and the controller assembly is in signal connection with the temperature detector.

In a possible configuration, the temperature detector is one of a plurality of temperature detectors. The plurality of temperature detectors and the plurality of side burners are arranged in a manner of one-to-one correspondence.

In a possible configuration, a grill grid is disposed in the grill cavity: the burner assembly is disposed beneath the grill grid. A guide structure is disposed between the burner assembly and the grill grid. An oil collector is disposed beneath the guide structure. The guide structure is configured to guide an oil liquid to the oil collector.

In a possible configuration, the guide structure is provided with ventilation holes, which penetrate through the guide structure. The grill further comprises shielding structures. Each of the shielding structures is disposed at a side of the guide structure facing towards the grill grid. A part of each of the shielding structures covers above a corresponding one of the ventilation holes. Each of the shielding structures has a ventilation channel. One end of the ventilation channel is in communication with the corresponding one of the ventilation holes, and the other end of the ventilation channel is disposed at a side surface of a corresponding one of shielding structure.

In a possible configuration, one side of the guide structure facing towards the grill grid is provided with a first guide surface, and the first guide surface is inclinedly arranged relative to a horizontal plane.

In a possible configuration, an oil discharge port penetrates through a bottom wall of the grill cavity. The oil discharge port is disposed above an oil collecting port of the oil collector. The bottom wall of the grill cavity has a second guide surface arranged inclinedly towards an oil discharge direction of the oil discharge port.

Advantages of the grill according to embodiments of the present application are summarized as follows: during the control process of the grill provided by the embodiments of the present application, when the controller assembly controls the first solenoid valve to open, the gas in the gas supply enters the main burner via the first solenoid valve, so that the main burner can be ignited. After that, the controller assembly can control the on-off state of the second solenoid valve according to requirements. When the second solenoid valve is opened, a part of the gas in the first solenoid valve enters the side burner via the second solenoid valve, so that the side burner can also be ignited, and the area near the side burner can be heated. It is known from the above that by adopting the controller assembly to control the on-off states of the first solenoid valve and the second solenoid valve, the grill provided by embodiments of the present application may realize the temperature adjustment of the area in the vicinity of the side burner, thus achieving the purpose that food having different temperature requirements can be treated differently in a single grill cavity, and realizing relatively high cook efficiency.

BRIEF DESCRIPTION OF THE DRAWINGS

In order to more clearly illustrate the technical solutions in the embodiments of the present application, the drawings that need to be used in the description of the embodiments or the prior art will be briefly described hereinbelow. Obviously, the accompanying drawings in the following description are only some embodiments of the present application. For those skilled in the art, other drawings can be obtained based on these drawings without creative work.

Figure 1:
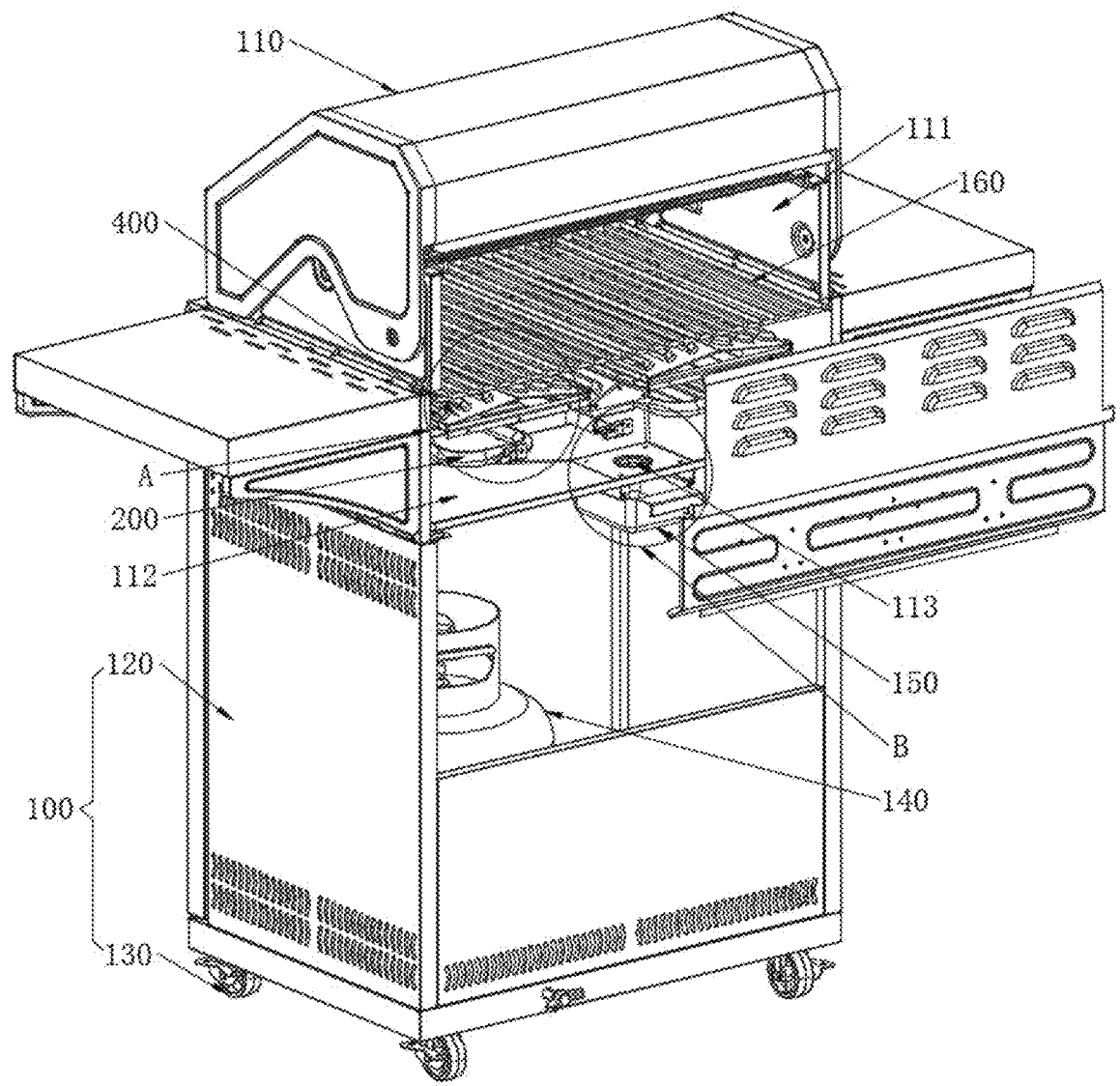
FIG. 1 is a partially exploded structural schematic view of a grill provided by an embodiment of the present application.

In the drawings, the following reference numerals are employed:

100: Support frame: 110: Grill box: 111: Grill cavity: 112: Second guide surface: 113: Oil discharge port: 120: Cabinet: 130: Wheel: 140: Gas supply: 150: Oil collector: 151: Oil collecting port: 160: Grill grid: 200: Burner assembly: 210: Main burner: 220: Side burner: 230: First solenoid valve: 240: Second solenoid valve: 300: Controller assembly: 310: Control knob: 320: Display screen: 330: Temperature detector: 340: Temperature display: 400: Guide structure; 410: Shielding structure; 411: Ventilation channel: 420: Guide plate: 421: First guide surface; and 422: Ventilation hole.

DETAILED DESCRIPTION OF THE EMBODIMENTS

In order to make the purposes, technical solutions, and advantages of the present application clearer and more understandable, the present application will be further described in detail hereinafter with reference to the accompanying drawings and embodiments. It should be understood that the embodiments described herein are only intended to illustrate but not to limit the present application.

It should be noted that when an element is described as "fixed" or "arranged" on/at another element, it means that the element can be directly or indirectly fixed or arranged on/at another element. When an element is described as "connected" to/with another element, it means that the element can be directly or indirectly connected to/with another element.

It should be understood that terms "length", "width", "upper", "lower", "front", "rear", "left", "right", "vertical", "horizontal", "top", "bottom", "inside", "outside" and the like indicating orientation or positional relationship are based on the orientation or the positional relationship shown in the drawings, and are merely for facilitating and simplifying the description of the present application, rather than indicating or implying that a device or component must have a particular orientation, or be configured or operated in a particular orientation, and thus should not be construed as limiting the application.

Moreover, the terms "first" and "second" are adopted for descriptive purposes only and are not to be construed as indicating or implying a relative importance or implicitly indicating the number of technical features indicated. Thus, features prefixed by "first" and "second" will explicitly or implicitly represent that one or more of the referred technical features are included. In the description of the present application, the meaning of "a plurality of" or "multiple" is two or more unless otherwise particularly defined.

In order to illustrate the technical solutions described in the present application, the present application will be described in detail in conjunction with specific drawings and embodiments hereinbelow.

Figure 2:
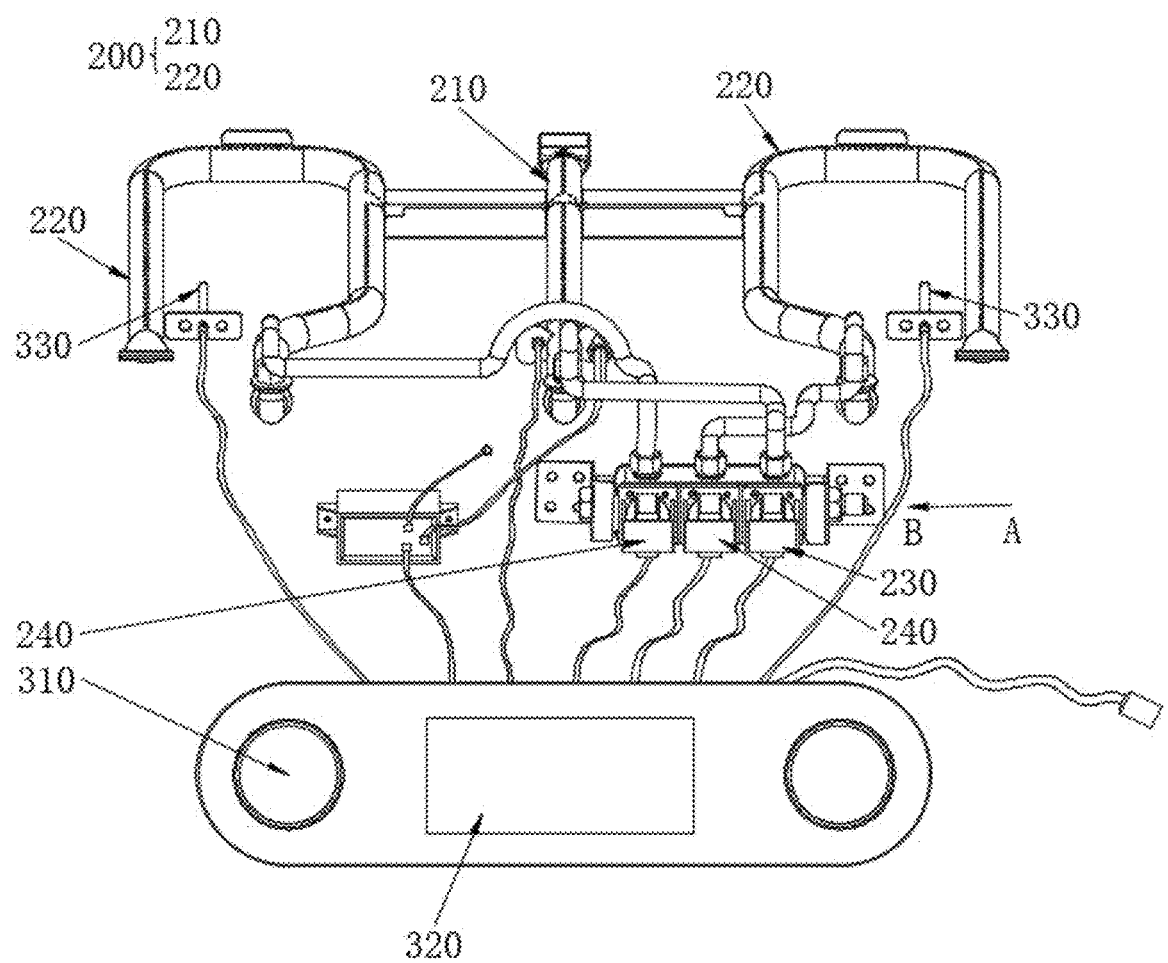
FIG. 2 is a partial structural schematic diagram of a grill provided by an embodiment of the present application.

As shown in FIGS. 1-2, embodiments of the present application provide a grill. The grill includes: a grill box 110, a burner assembly 200, a first solenoid valve 230, a second solenoid valve 240, and a controller assembly 300. The grill box 110 defines therein a grill cavity 111, and the burner assembly 200 is arranged in the grill cavity 111. The burner assembly 200 includes a main burner 210 and a side burner 220. The first solenoid valve 230 is in connection with the main burner 210, the second solenoid valve 240 is in connection with the side burner 220, the second solenoid valve 240 is in connection with the first solenoid valve 2, and the first solenoid valve 230 is configured to connect with the gas supply 140. The controller assembly 300 is in connection with the first solenoid valve 230 and the second solenoid valve 240 respectively, and the controller assembly 300 is configured to control an on-off state of the first solenoid valve 230 and the second solenoid valve 240.

The gas supply 140 can be an external device, or a device included in the grill, which is not limited here. The gas supply 140 can particularly be a device that can supply gas such as a gas tank or a gas pipeline.

Both the first solenoid valve 230 and the second solenoid valve 240 are arranged in the grill cavity 111. The first solenoid valve 230 has an inner cavity and a gas inlet and at least two gas outlets, with the gas inlet and the at least two gas outlets communicating with the inner cavity. The first solenoid valve 230 is in communication with the main burner 210, which particularly refers to that one of the gas outlets of the first solenoid valve 230 communicates with a gas inlet of the main burner 210. The second solenoid valve 240 is in connection with the first solenoid valve 230, particularly referring to that a gas inlet of the second solenoid valve 240 communicates with the other gas outlet of the first solenoid valve 230. The first solenoid valve 230 is in connection with the gas supply 140, particularly referring to that the gas inlet of the first solenoid valve 230 communicates with a gas outlet of the gas supply 140. A gas in the gas supply 140 enters the inner cavity of the first solenoid valve 230 via the gas inlet of the first solenoid valve 230. As shown in FIG. 2, a direction indicated by an arrow AB in FIG. 2 is a gas intake direction of the first solenoid valve 230. The second solenoid valve 240 may have the same structure as the first solenoid valve 230, so as to facilitate batch procurement or production of the first solenoid valve 230 and the second solenoid valve 240. When the second solenoid valve 240 has the same structure as the first solenoid valve 230, one of the gas outlets of the second solenoid valve 240 communicates with the gas inlet of the side burner 220, thereby realizing the connection between the second solenoid valve 240 and the side burner 220; while the other gas outlet of the second solenoid valve 240 can be blocked and therefore does not communicate with any structure. Or alternatively, the second solenoid valve 240 may also have a different structure from the first solenoid valve 230, for example, the second solenoid valve 240 may have only one gas outlet, and the gas outlet communicates with a gas inlet of the side burner 220.

It should be noted that the on-off states of the first solenoid valve 230 and the second solenoid valve 240 mentioned throughout all refer to the on-off states of the gas inlets of the first solenoid valve 230 and the second solenoid valve 240. When the first solenoid valve 230 is opened, that is, the gas inlet of the first solenoid valve 230 is opened, the gas in the gas supply 140 can enter the gas inlet of the main burner 210) through the first solenoid valve 230, and reach the gas inlet of the second solenoid valve 240 via one of the gas outlets of the first solenoid valve 230. When the second solenoid valve 240 is opened, that is, the gas inlet of the second solenoid valve 240 is opened, so that the gas in the first solenoid valve 230 can enter the gas inlet of the side burner 220 via the second solenoid valve 240. When the main burner 210 has been introduced with the gas, the main burner 210 can be ignited by an ignition structure, which can include a lighter, a match, a flame gun or an ignition pin. When the ignition structure includes the ignition pin, the ignition pin can be in connection with the controller assembly 300, and the controller assembly 300 can control the ignition pin to ignite the main burner 210. After the side burner 220 has been introduced with the gas, when the side burner 220 and the main burner 210 are relatively close, the gas in the side burner 220 can be ignited by the flame in the main burner 210, in this way, the use of ignition structures can be reduced, and the costs can be saved. When the side burner 220 is arranged relatively far away from the main burner 210 and the gas in the side burner 220 cannot be ignited by the flame in the main burner 210, the side burner 220 can also be ignited by the ignition structure.

Compared with the prior art, during the control process of the grill provided by the embodiments of the present application, when the controller assembly 300 controls the first solenoid valve 230 to open, the gas in the gas supply 140 enters the main burner 210 via the first solenoid valve 230, so that the main burner 210 can be ignited to enter the combustion state. After that, the controller assembly 300 can control the second solenoid valve 240 to open, according to requirements, and part of the gas in the first solenoid valve 230 enters the side burner 220 via the second solenoid valve 240, so that the side burner 220 can also be ignited to enter a combustion state, so as to heat the area near the side burner 220. When the temperature in the area near the side burner 220 reaches a required temperature or after a certain period of heating, the controller assembly 300 can be used again to control the second solenoid valve 240 to close, so that the side burner 220 is in the closed state, in this way, the temperature adjustment of the area in the grill cavity 111 near the side burner 220 can be realized. It can be seen from the above that the grill provided in this embodiment can adjust the temperature of the area in the grill cavity 111 near the side burner 220, so that the food in the area near the side burner 220 can be thawed or temperature-preserved, and meanwhile, other foods can be grilled near the main burner 210. In this way, the purpose of different processing of foods with different temperature requirements in the same the grill cavity 111 can be achieved at the same time, and the cooking efficiency is higher.

Since the gas supply 140 is usually arranged outside the grill box 110, if the first solenoid valve 230 and the second solenoid valve 240 are respectively connected to the gas supply 140, a certain number of pipes or other connectors are required, which may increase the structural complexity of the grill, and thereby increasing the difficulty of assembly. In contrast, in this embodiment, only the first solenoid valve 230 is in connection with the gas supply 140, and the second solenoid valve 240 are in connection with the first solenoid valve 230. As the first solenoid valve 230 and the second solenoid valve 240 are disposed in the grill cavity 111, the second solenoid valve 240 can be directly connected to the first solenoid valve 230, in this way, the structural complexity of the grill can be reduced to a certain extent degree, thereby reducing the difficulty of assembly.

In a possible configuration, a plurality of side burners 220 and a plurality of second solenoid valves 240 are provided. The plurality of side burners 220 and the plurality of second solenoid valves 240 are arranged in a manner of one-to-one correspondence. In this way, the temperatures near the plurality of side burners 220 in the grill cavity 111 can be controlled correspondingly, so that the temperature in more areas of the grill cavity 111 can be adjusted.

In a specific embodiment, referring to FIG. 2, both the number of the side burners 220 and the number of the second solenoid valves 240 are two, each of the side burners 220 is in connection with a corresponding second solenoid valve 240, and the two second solenoid valves 240 are connected to the first solenoid valve 230 respectively: Optionally, the first solenoid valve 230 may have three gas outlets, one of the three gas outlets is connected to an inlet of the main burner 210 via a pipeline, and the other two gas outlets are connected to gas inlets of the two second solenoid valves 240, respectively. Or alternatively, the first solenoid valve 230 has two gas outlets, one of the two gas outlets is connected to the inlet of the main burner 210 via a pipe, and the other gas outlet is connected to the gas inlets of two second solenoid valves 240, respectively, via a three-way pipe. As shown in FIG. 2, the two side burners 220 are respectively disposed on opposite sides of the main burner 210, which allows the main burner 210 to ignite the gas in the side burners 220 to combust. Each of the second solenoid valves 240 has at least one gas outlet, and the gas outlet of each second solenoid valve 240 is connected to the gas inlet of the corresponding side burner 220 via a pipe. The two second solenoid valves 240 are respectively connected to the controller assembly 300, and the on-off states of the second solenoid valves 240 are respectively controlled by the controller assembly 300, so as to control the combustion states of the corresponding side burners 220, thereby adjusting the temperatures of the area around corresponding side burners 220.

In a possible configuration, each of the plurality of second solenoid valves 240 is connected to the first solenoid valve 230. In this configuration, the on-off states of any one or more of the second solenoid valves 240 can be controlled as required 240, such that the gas entering the first solenoid valve 230 can be introduced into any one or more of the second solenoid valves 240, the temperature of any one or more areas near the side burner 220 can be controlled separately, and it is more flexible for the grill provided in this embodiment to adjust the temperature of different areas in the grill cavity 111. By adopting the grill provided in this embodiment, not only can the food with different temperature requirements be treated in areas near different side burners 220, so as to improve cooking efficiency, but also one or more second solenoid valves 240 can be selectively opened according to the amount of food. For example, when the food is relatively few; only the first solenoid valve 230 or together with one or a small number of the second solenoid valves 240 can be opened at the same time, so as to save the fuel. In contrast, when the food is relatively much, the first solenoid valve 230 together with a large number of the second solenoid valves 240 can be opened, such that the food can be baked near the main burner 210 as well as the multiple side burners 220, thereby improving the cooking efficiency. With such arrangement, the grill provided by embodiments of the present application can achieve an excellent balance between saving the fuel and improving the cooking efficiency.

It should be noted that the number of gas outlets of the first solenoid valve 230 is at least equal to a total number of the second solenoid valves 240 and the main burner 210, and the structure of the second solenoid valve 240 can be the same as or different from the structure of the first solenoid valve 230. When the structure of the second solenoid valve 240 is the same as that of the first solenoid valve 230, redundant gas outlets in the second solenoid valves 240 can be blocked. When the structure of the second solenoid valve 240 is different from that of the first solenoid valve 230, the second solenoid valve 240 may only have one gas outlet, which is configured to be in connection with the gas inlet of the corresponding side burner 220.

Or alternatively, in another possible configuration, the plurality of second solenoid valves 240 are sequentially connected, and one of the plurality of second solenoid valves 240 is connected with the first solenoid valve 230. In this arrangement, the number of gas outlets in the first solenoid valve 230 can be reduced, that is, the structural complexity of the first solenoid valve 230 can be reduced, and, in such an arrangement, the first solenoid valve 230 and the second solenoid valves 240 can be have the same structure, so that it is convenient to purchase or produce the first solenoid valve 230 and the second solenoid valves 240 in batches. In this embodiment, the first solenoid valve 230 and the second solenoid valves 240 all have one gas inlet and two gas outlets, the gas inlet of one of the second solenoid valves 240 communicates with one of the gas outlets of the first solenoid valve 230, one of the gas outlets of the second solenoid valves 240 communicates with the gas inlet of the corresponding side burner 220, and the other gas outlet of the second solenoid valves 240 communicates with the gas inlet of the other second solenoid valve 240.

Figure 3:
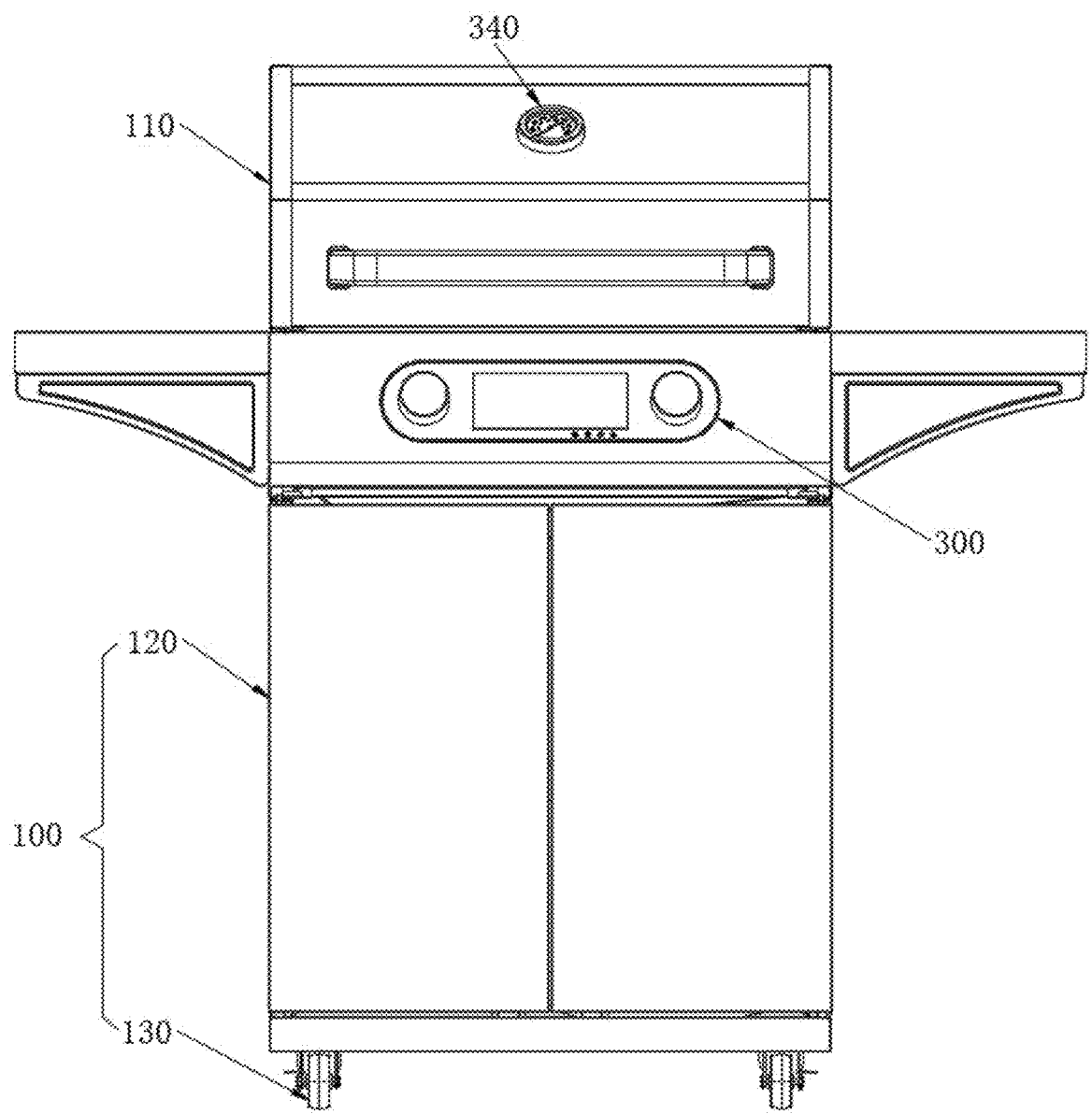
FIG. 3 is an overall schematic structural view of a grill provided by an embodiment of the present application.

Referring to FIGS. 2-3, the controller assembly 300 may include control knobs 310, the plurality of second solenoid valves 240 are in connection with the control knobs 310, respectively, so that the users can manually operate the control knobs 310, in order to control the on-off states of the corresponding second solenoid valves 240, and then adjust the temperature near the corresponding side burners 220 in the grill cavity 111. Optionally, the controller assembly 300 further includes a controller, which is connected to the first solenoid valve 230 and the plurality of second solenoid valves 240 respectively, such that the on-off states of the first solenoid valve 230 and the plurality of second solenoid valves 240 can be controlled by the controller, and in turn the temperatures near the corresponding side burners 220 in the grill cavity 111 can be automatically adjusted by the controller. When the ignition structure further includes the ignition pin, the controller is further connected to the ignition pin, particularly, a pulser is also provided between the controller and the ignition pin, and the ignition pin is arranged at the gas outlet of the main burner 210, such that the controller can control the pulser to ignite the gas of the main burner 210.

Optionally, the main burner 210 includes a flameout protection device. The flameout protection device can be in connection with the controller assembly 300. When the flame in the main burner 210 is accidentally extinguished, the flameout protection device can cut off the gas supply towards the main burner 210, thereby improving the safety performance of the grill provided by this embodiment. In a specific control process, when the flameout protection device detects that the flame in the main burner 210 is extinguished and that the gas is still being discharged from the gas outlet of the main burner 210, in such condition, the flameout protection device sends a signal to the controller assembly 300 to enable the controller assembly 300 to turn off the first solenoid valve 230, and in turn cut off the gas supply towards the main burner 210.

In a possible configuration, as shown in FIG. 2, the grill further comprises a temperature detector 330. The temperature detector 330 is arranged in the grill cavity 111; and the controller assembly 300 is in signal connection with the temperature detector 330. It should be noted that the signal connection mentioned in this disclosure may be connection through a data line, or may be a wireless communication connection, which is not limited herein. Particularly, the temperature detector 330 is in signal connection with a controller of the controller assembly 300. Based on the temperature detector 330, the temperature in the grill cavity 111 can be controlled in real time, the controller can control the on-off states of the second solenoid valves 240 according to the temperature signal fed back by the temperature detector 330, so as to control the temperature in the grill cavity 111 in a more accurate manner. The temperature detector 330 may particularly be a temperature sensor, a temperature probe, or other structures capable of detecting the temperature.

In a possible configuration, a plurality of temperature detectors 330 are provided. The plurality of temperature detectors 330 and the plurality of side burners 220 are arranged in a manner of one-to-one correspondence. Based on such a configuration, the temperature in the vicinity of each side burner 220 can be monitored, so as to further improve the accuracy of the temperature adjustment of the grill provided by this embodiment.

In some optional embodiments, referring to FIG. 2, the controller assembly 300 further includes a display screen 320. The display screen 320 is in signal connection with the controller, and the display screen 320 can be used to display the temperature detected by the temperature detector 330. Further, the display screen 320 can be a touch screen, so that a required temperature range can be preset via the touch screen, thereby realizing automatic adjustment of the temperature in the vicinity of the respective side burners 220, and making the temperatures in the vicinity of the respective side burners 220 within the corresponding preset temperature range. Taking one of the side burners 220 as an example, during the temperature adjustment process, when the temperature detected by the temperature detector 330 corresponding to the side burner 220 is equal to or lower than the corresponding minimum preset temperature, the controller controls a corresponding second solenoid valve 240 in connection with such side burner 220 to be opened, so that the side burner 220 is fed with the gas and enters a combustion state, which makes the temperature of the area near the side burner 220 increase, until the temperature detected by the temperature detector 330 is equal to or higher than the maximum preset temperature, and in such condition, the controller controls the corresponding second solenoid valve 240 to close. In this embodiment, the minimum preset temperature of the area near the at least one side burner 220 can be 250° F., and the maximum preset temperature thereof can be 650° F., which can be set according to actual needs.

In a specific embodiment, as shown in FIG. 2, the number of the side burner 220 and the number of second solenoid valve 240 are both two, and one temperature detector 330 is correspondingly arranged above each of the side burners 220. The two temperature detectors 330 and the two second solenoid valves 240 are all in signal connection with the controller, such that the temperatures in the vicinity of the two side burners 220 are respectively controlled by the controller. Optionally, the food near one of the side burners 220 can be thawed, and the food near the other side burner 220 can have the temperature preserved, and the food above the main burner 210 can also be grilled at the same time.

In some optional embodiments, an overall temperature detector is installed at an inner wall of the grill cavity 111, a temperature display 340 is installed at an outer wall of the grill box 110, the overall temperature detector is in connection with the temperature display 340, and the overall temperature detector is configured to detect an overall temperature (referring to a highest temperature reached in the grill cavity 111 at any time) in the grill cavity 111. The temperature display 340 is used to display a temperature detected by the overall temperature detector, so that the user can control the overall temperature in the grill cavity 111 according to the temperature value displayed on the temperature display 340. In a specific implementation, the temperature display 340 includes a dial, a processor, and a pointer. The processor is connected to the overall temperature detector and the pointer respectively, and the processor can control the pointer to point to a corresponding numerical value on the dial according to the temperature value detected by the overall temperature detector, thereby controlling the temperature display 340 to display the overall temperature of the grill cavity 111. Optionally, the overall temperature range within the grill cavity 111 is between 250° F. and 650° F.

Figure 4:
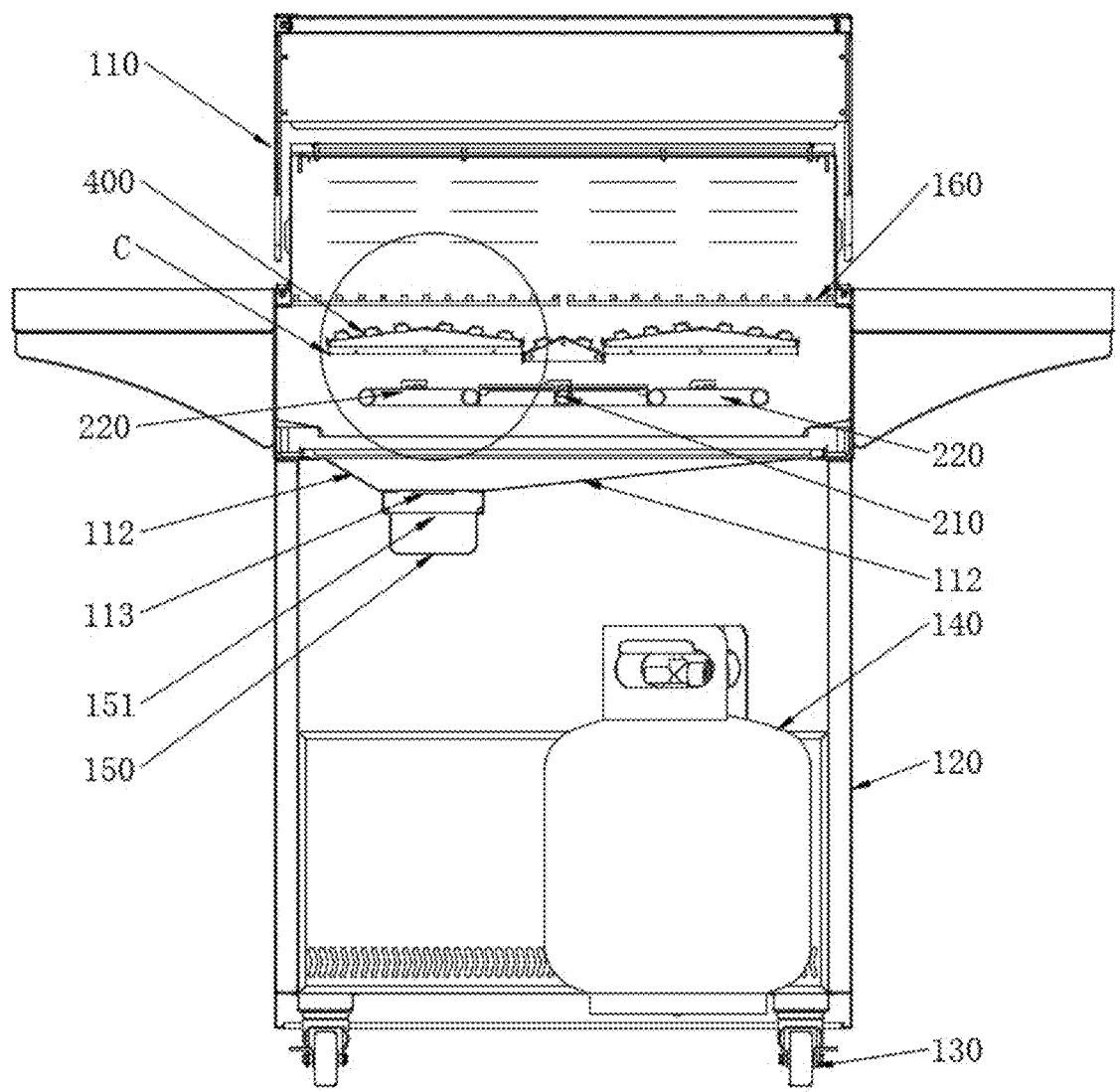
FIG. 4 is a cross-sectional structural schematic view of a grill provided by an embodiment of the present application.

In a possible configuration, a grill grid 160 is disposed in the grill cavity 111. The burner assembly 200 can be disposed above the grill grid 160 or below the grill grid 160. When the burner assembly 200 is disposed above the grill grid 160, the oil can be prevented from being ignited or scorched by the flames of the main burner 210 or the side burners 220, thereby reducing the production of the oil smoke. Referring to FIG. 1 or FIG. 4, in case that the burner assembly 200 is disposed beneath the grill grid 160, a guide structure 400 is disposed between the burner assembly 200 and the grill grid 160. An oil collector 150 is disposed beneath the guide structure 400. The guide structure 400 is configured to guide an oil liquid to the oil collector 150. In such a configuration, the oil exuding out during the food grilling process can be collected in the oil collector 150. On the one hand, the hygiene and cleanliness of the grill provided by embodiments of the present application can be improved, and on the other hand, the oil liquid can be prevented from dropping onto the flames of the main burner 210 or the side burners 220, thereby reducing the oily smoke produced in burning or scorching of the oil.

The guide structure 400 can particularly guide the oil into the oil collector 150 through a guide pipe or a guide groove. Or alternatively, in a possible configuration, referring to FIG. 5, one side of the guide structure 400 facing towards the grill grid 160 is provided with a first guide surface 421, and the first guide surface 421 is inclinedly arranged relative to a horizontal plane. When the oil liquid drops onto the first guide surface 421, the oil liquid can flow into the oil collector 150 along the first guide surface 421, thereby realizing the guiding of oil liquid into the oil collector 150.

Figure 6:
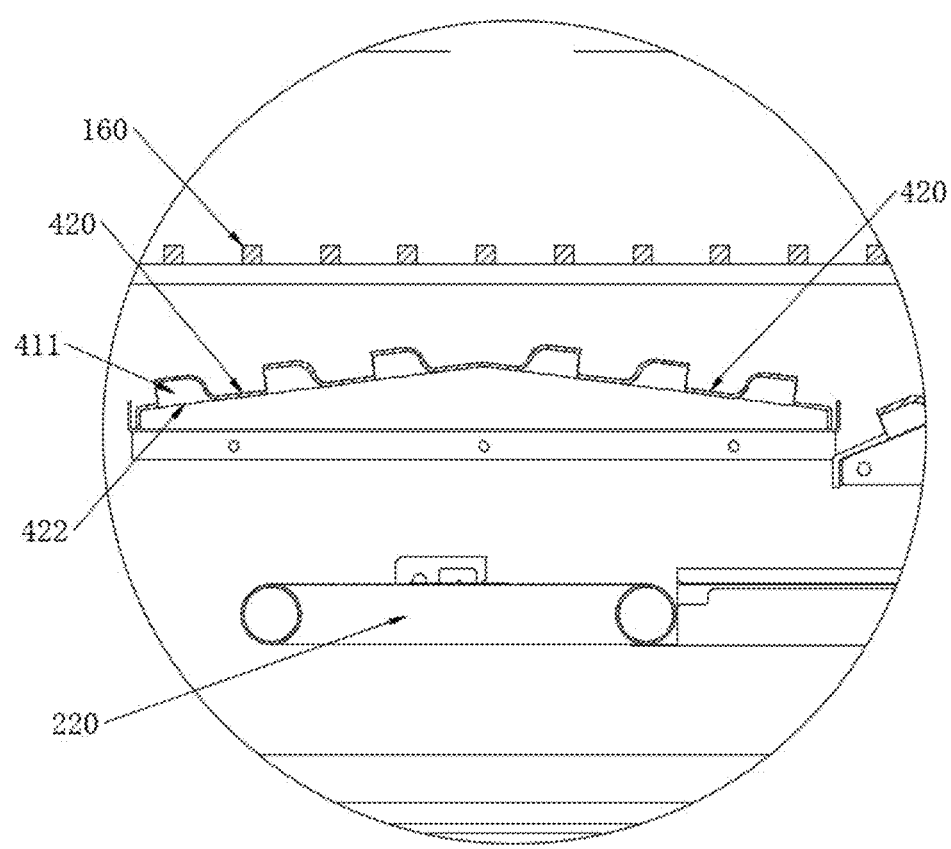
FIG. 6 is a partially enlarged schematic view of Part C in FIG. 4.

In a specific implementation manner, as shown in FIG. 6, the guide structure 400 includes a plurality of guide plates 420. Above each of the main burner 210 and the plurality of side burners 220 are respectively disposed two symmetrically arranged guide plates 420. The guide plates 420 are all arranged inclinedly relative to the horizontal plane, and horizontal sides of every two symmetrically arranged guide plates 420 having relatively high heights are connected, and a side surface of each of the plurality of guide plates 420 facing towards the grill grid 160 forms the first guide surface 421. In this way, when the oil liquid drops to the first guide surface 421, the oil liquid can drop to the oil collector 150 from horizontal sides of the two symmetrically arranged guide plates 420 having relatively low heights, so as to guide the oil liquid towards the oil collector 150.

As shown in FIG. 4, the side burners 220 are arranged at two opposite sides of the main burner 210, respectively, and above the main burner 210 cover two symmetrically arranged guide plates 420, one horizontal side of each of the two guide plates 420 having a relatively low height is arranged right above a gap between the main burner 210 and a corresponding adjacent side burner. Above each of the two side burners 220 cover two symmetrically arranged guide plates 420. Taken one of the side burners 220 as an example, in the two symmetrically arranged guide plates 420 covering such side burner 220, one horizontal side of one of the two guide plates 420 having the relatively low height is disposed right above a gap between the main burner 210 and the corresponding side burner 220, while one horizontal side of the other one of the two guide plates 420 having the relatively low height is disposed right above the corresponding side burner 220 and an inner wall of the grill cavity: For the two side burners 220, the symmetrically arrangements of the two guide plates 420 above the side burners 220 are the same, which will not repeated herein. With such a configuration, the oil liquid can be dripped onto the oil collector 150 more accurately, which further prevents the oil liquid from dripping onto the flames of the main burner 210 or the side burners 220.

Figure 5:
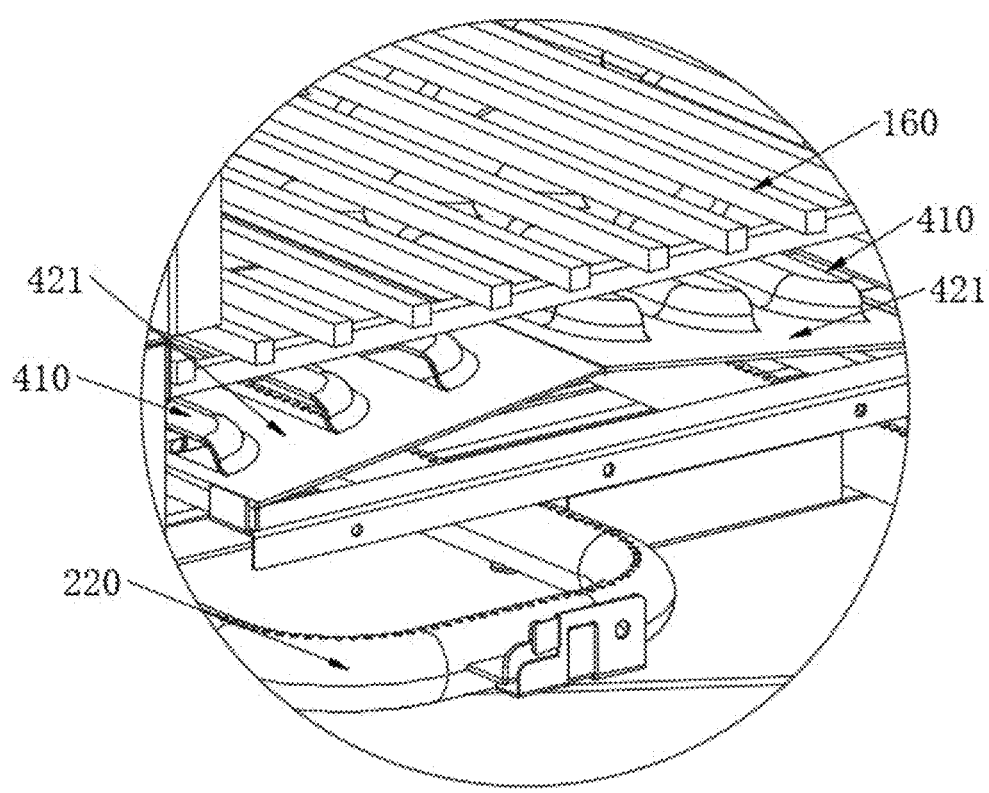
FIG. 5 is a partially enlarged schematic view of Part A in FIG. 1.

In a possible configuration, as shown in FIG. 5 and FIG. 6, the guide structure 400 is provided with ventilation holes 422, which penetrate through the guide structure 400. The grill further comprises shielding structures 410. Each of the shielding structures 410 is disposed at a side of the guide structure 400 facing towards the grill grid 160. A part of each of the shielding structures 410 covers above a corresponding one of the ventilation holes 422. Each of the shielding structures 410 has a ventilation channel 411. One end of the ventilation channel 411 is in communication with the corresponding one of the ventilation holes 422, and the other end of the ventilation channel 411 is disposed at a side surface of a corresponding one of shielding structure 410. By providing the ventilation hole 422, the gas circulation on the upper and lower sides of the guide structure 400 is facilitated, which facilitates the transferring of the heat generated by the combustion of the main burner 210 and the side burners 220 to the grill grid 160 via the ventilation hole 422, thereby realizing the treatments such as grilling, thawing, or temperature preservation of the food on the grill grid 160. By providing the shielding structure 410, the oil dripping from the grill grid 160 can be shielded, and the oil is prevented from dripping through the ventilation hole 422 to the flames of the main burner 210 or the side burners 220. It can be seen from the above that, in this implementation manner, not only the generation of oily smoke is effectively reduced, but also the heat generated by the burner assembly 200 can be promoted to transfer to the grill grid 160, thereby reducing the heat loss. In this embodiment, the shielding structures 410 are particularly arranged on the side of the guide plate 420 facing towards the grill grid 160, that is, the shielding structures 410 are arranged on the guide surface. In some optional embodiments, both the number of the shielding structures 410 and the ventilation holes 422 are plural, and the plurality of the shielding structures 410 and the plurality of the ventilation holes 422 are arranged in one-to-one correspondence. By providing the plurality of the ventilation holes 422, it is beneficial to increase the rate of gas circulation, thereby increasing the speed of heat transfer.

Figure 7:
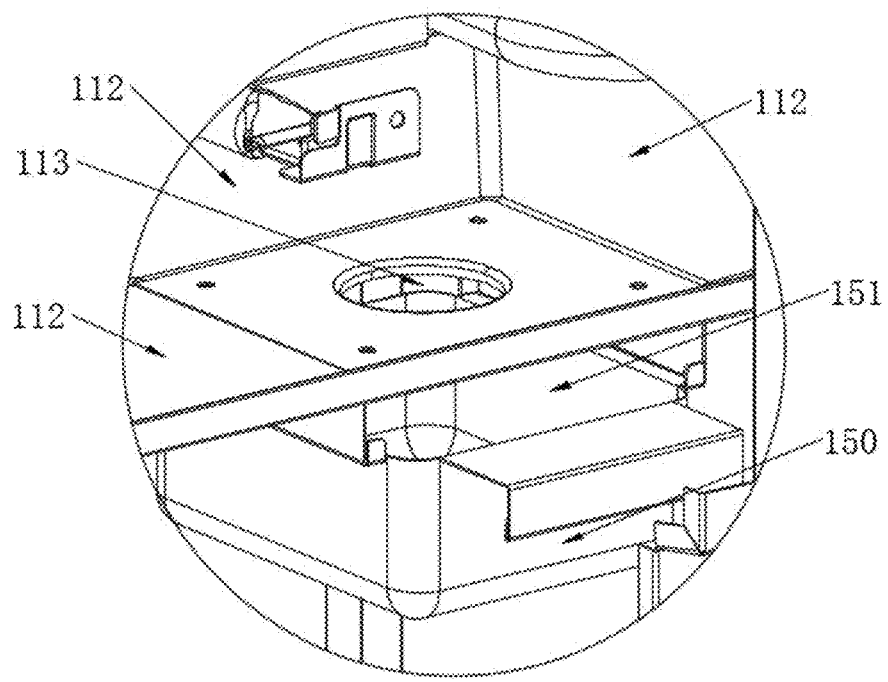
FIG. 7 is a partially enlarged schematic view of the Part B in FIG. 1.

In order to facilitate cleaning and replacement of the oil collector 150, the temperature-controlled oil collector 150 provided in embodiments of the present application is arranged beneath the grill box 110. In a possible configuration, as shown in FIG. 4 and FIG. 7, an oil discharge port 113 penetrates through a bottom wall of the grill cavity 111. The oil discharge port 113 is disposed above an oil collecting port 151 of the oil collector 150. The bottom wall of the grill cavity 111 has a second guide surface 112 arranged inclinedly towards an oil discharge direction of the oil discharge port 113. The oil discharge port 113 is disposed above the oil collecting port 151, so that the oil directly drops to the oil collecting port 151 via the oil discharge port 113, and the oil discharge direction of the oil discharge port 113 is the vertical direction. It should be noted that, in this embodiment, the direction inclined to the oil discharge direction particularly refers to a direction inclined by a certain angle from the oil discharge direction, and such certain angle can be any angle other than 90 degrees, that is, the second guide surface 112 is also inclined from the horizontal direction, and a horizontal side of the second guide surface 112 having a relatively low height is in connection with the oil discharge port 113. In this arrangement, after the oil liquid drops to the bottom wall of the grill cavity 111, that is, after the oil liquid drops to the second guide surface 112, the oil liquid can flow out from the oil discharge port 113 along the second guide surface 112, until dropping into the oil collector 150. Therefore, the arrangement of the second guide surface 112 on the bottom wall of the grill cavity 111 and inclined from the oil discharge direction of the oil discharge port 113 is conducive to the guiding of the oil liquid dripped onto the bottom wall of the grill cavity 111 towards the oil collector 150.

In some optional embodiments, a plurality of second guide surface 112 can be provided. The plurality of second guide surfaces 112 are connected in sequence, and the plurality of second guide surfaces 112 are enclosed around an outer periphery of the oil discharge port 113, so that most of the oil dripped from the grill grid 160 can be guided to the oil discharge port 113 via the plurality of second guide surfaces 112. Particularly, the number of the second guide surface 112 is four, and the four second guide surfaces 112 are sequentially connected and enclosed around the outer periphery of the oil discharge port 113.

In some optional embodiments, as shown in FIG. 1 and FIG. 3, the grill provided in this embodiment of the present application further includes a support frame 100, and the grill box 110 is installed on the support frame 100, so that the grill box 110 is supported on the ground surface or other supporting platform via the support frame 100. The support frame 100 has a cabinet 120, the cabinet 120 can be used to accommodate the gas supply 140, such as a gas tank, or alternatively, the cabinet 120 can also be used to store other items, such as food and ingredients, etc., which will not be limited herein. A bottom of the support frame 100 is provided with wheels 130 to facilitate the movement of the grill.

The aforementioned embodiments are only preferred embodiments of the present application, and are not intended to limit the present application. Any modification, equivalent replacement, improvement, and so on, which are made within the spirit and the principle of the present application, should be included in the protection scope of the present application.

What is claimed is:

1. A grill, comprising:
    a grill box, defining therein a grill cavity;
    a burner assembly, comprising a main burner and a side burner;
    a first solenoid valve;
    a second solenoid valve; and
    a controller assembly;
wherein
    the burner assembly is arranged in the grill cavity;
    the first solenoid valve is in connection with the main burner;
    the second solenoid valve is in connection with the side burner and the first solenoid valve;
    the first solenoid valve is configured to connect with a gas supply;
    the controller assembly is in connection with the first solenoid valve and the second solenoid valve, respectively;
the controller assembly is configured to control an on-off state of the first solenoid valve and the second solenoid valve;
    wherein a grill grid is disposed in the grill cavity;
    the burner assembly is disposed beneath the grill grid;
    a guide structure is disposed between the burner assembly and the grill grid;
    an oil collector is disposed beneath the guide structure; and
    the guide structure is configured to guide an oil liquid to the oil collector;
    the guide structure comprises a plurality of guide plates, above each of the main burner and the plurality of side burners are respectively disposed two symmetrically arranged guide plates, the plurality of guide plates are all arranged inclinedly relative to a horizontal plane and horizontal sides of every two symmetrically arranged guide plates having relatively high heights are connected;
    wherein the guide structure is provided with a plurality of ventilation holes, the plurality of ventilation holes are disposed on the plurality of guide plates and penetrate through the plurality of guide plates, respectively;
    the grill further comprises a plurality of shielding structures which are arranged on sides of the plurality of guide plates facing towards the grill grid, respectively;
    the plurality of shielding structures and the plurality of ventilation holes are arranged in one-to-one correspondence, and a part of each of the plurality of shielding structures covers above a corresponding one of the plurality of ventilation holes;
    each of the shielding structures has a ventilation channel, one end of the ventilation channel is in communication with the corresponding one of the plurality of ventilation holes, and an other end of the ventilation channel is disposed at a side surface of a corresponding one of shielding structure.

2. The grill of claim 1, wherein
a side surface of each of the plurality of guide plates facing towards the grill grid forms a first guide structure, and the first guide surface is inclinedly arranged relative to the horizontal plane.

3. The grill of claim 1, wherein
an oil discharge port penetrates through a bottom wall of the grill cavity;

the oil discharge port is disposed above an oil collecting port of the oil collector; and the bottom wall of the grill cavity has a second guide surface arranged inclinedly towards an oil discharge direction of the oil discharge port.

4. The grill of claim 1, wherein two side burners are arranged at two opposite sides of the main burner, respectively, above the main burner cover two symmetrically arranged guide plates, one horizontal side of each of the two guide plates having a relatively low height is arranged right above a gap between the main burner and a corresponding adjacent side burner, above each of the two side burners cover another two symmetrically arranged guide plates.

5. The grill of claim 1, wherein the side burner is one of a plurality of side burners; the second solenoid valve is one of a plurality of second solenoid valves; and the plurality of side burners and the plurality of second solenoid valves are arranged in a manner of one-to-one correspondence.

6. The grill of claim 5, wherein each of the plurality of second solenoid valves is connected to the first solenoid valve.

7. The grill of claim 5, wherein the plurality of second solenoid valves are sequentially connected, and one of the plurality of second solenoid valves is connected with the first solenoid valve.

8. The grill of claim 5, wherein
the controller assembly comprises control knobs, the plurality of second solenoid valves are in connection with the control knobs, respectively, such that the on-off states of the plurality of second solenoid valves are controlled by operating the corresponding control knobs.

9. The grill of claim 5, further comprising
a temperature detector;
wherein the temperature detector is arranged in the grill cavity; and the controller assembly is in signal connection with the temperature detector, and a controller of the controller assembly is configured to control on-off states of the second solenoid valve according to a temperature signal fed back by the temperature detector.

10. The grill of claim 9, wherein the temperature detector is one of a plurality of temperature detectors; and the plurality of temperature detectors and the plurality of side burners are arranged in a manner of one-to-one correspondence.

11. The grill of claim 9, wherein the controller assembly further comprises a display screen, the display screen is in signal connection with the controller, and the display screen is configured to display a temperature detected by the temperature detector.

12. The grill of claim 11, wherein the display screen is a touch screen via which a preset temperature range is preset.

* * * * *